US011455569B2

(12) United States Patent
Valdez et al.

(10) Patent No.: US 11,455,569 B2
(45) Date of Patent: Sep. 27, 2022

(54) DEVICE DISCOVERY AND CLASSIFICATION FROM ENCRYPTED NETWORK TRAFFIC

(71) Applicant: International Business Machines Corporation, Armonk, NY (US)

(72) Inventors: Enriquillo Valdez, Queens, NY (US); Pau-Chen Cheng, Yorktown Heights, NY (US); Ian Michael Molloy, Westchester, NY (US); Dimitrios Pendarakis, Westport, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 549 days.

(21) Appl. No.: 16/243,129

(22) Filed: Jan. 9, 2019

(65) Prior Publication Data

US 2020/0219005 A1    Jul. 9, 2020

(51) Int. Cl.
*G06N 20/00*    (2019.01)
*G06N 5/02*    (2006.01)

(52) U.S. Cl.
CPC ............. *G06N 20/00* (2019.01); *G06N 5/02* (2013.01)

(58) Field of Classification Search
CPC .................................. G06N 20/00; G06N 5/00
See application file for complete search history.

(56) References Cited

U.S. PATENT DOCUMENTS

| 7,397,811 | B2 | 7/2008 | Green |
| 9,479,481 | B2 | 10/2016 | Budhani et al. |
| 10,229,205 | B1* | 3/2019 | Grant ................... G06F 16/951 |
| 2017/0353437 | A1 | 12/2017 | Ayyadevara et al. |
| 2018/0124085 | A1* | 5/2018 | Frayman ................ G06N 20/20 |
| 2019/0107827 | A1* | 4/2019 | Dhakshinamoorthy ..................... G05B 19/4183 |
| 2019/0190960 | A1* | 6/2019 | Amro ...................... H04L 43/04 |
| 2019/0245866 | A1* | 8/2019 | Anderson ............. H04L 63/166 |
| 2019/0253319 | A1* | 8/2019 | Kampanakis .......... G06N 5/025 |
| 2019/0349426 | A1* | 11/2019 | Smith ................... H04L 63/123 |
| 2020/0067935 | A1* | 2/2020 | Carnes, III ............ H04L 63/105 |
| 2020/0134083 | A1* | 4/2020 | Elliman ................. G06F 17/18 |
| 2020/0167677 | A1* | 5/2020 | Verma .................... G06N 5/003 |

(Continued)

OTHER PUBLICATIONS

Costin et al., "Towards automated classification of firmware images and identification of embedded devices." IFIP International Conference on ICT Systems Security and Privacy Protection. Springer, Cham, 2017.

(Continued)

*Primary Examiner* — Michael J Huntley
*Assistant Examiner* — Imad Kassim
(74) *Attorney, Agent, or Firm* — Garg Law Firm, PLLC; Rakesh Garg; Joseph Petrokaitis

(57) ABSTRACT

Handshake protocol layer features are extracted from training data associated with encrypted network traffic of a plurality of classified devices. Record protocol layer features are extracted from the training data. One or more models are trained based on the extracted handshake protocol layer features and the extracted record protocol layer features. The one or more models are applied to an observed encrypted network traffic stream associated with a device to determine a predicted device classification of the device.

17 Claims, 9 Drawing Sheets

(56) References Cited

U.S. PATENT DOCUMENTS

2020/0218939 A1\* 7/2020 Mansour .............. G06K 9/6255
2020/0274812 A1\* 8/2020 Ouyang .............. H04L 63/0428

OTHER PUBLICATIONS

Samarasinghe et al., "Short paper: TLS ecosystems in networked devices vs. web servers." International Conference on Financial Cryptography and Data Security. Springer, Cham, 2017.
Durumeric, et al. "A search engine backed by Internet-wide scanning." Proceedings of the 22nd ACM SIGSAC Conference on Computer and Communications Security. ACM, 2015.
Clemm t al., "Auto-discovery at the network and service management layer." Integrated Network Management VIII. Springer, Boston, MA, 2003. 365-378.
Stelma, "Securing the Home Network." DISS, Eindhoven University of Technology (2015).

\* cited by examiner

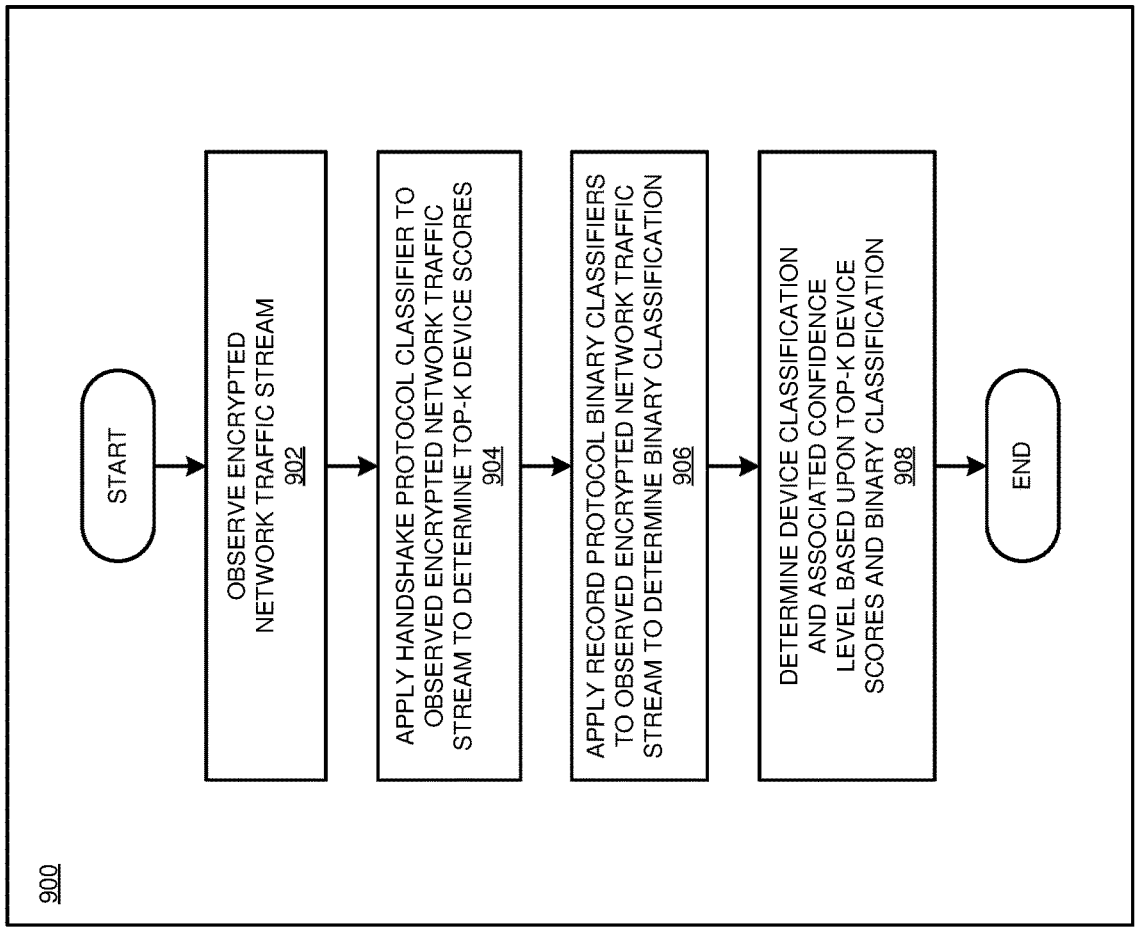

DEVICE DISCOVERY AND CLASSIFICATION FROM ENCRYPTED NETWORK TRAFFIC

GOVERNMENT RIGHTS

This invention was made with United States government support under a contract awarded by a Federal agency. The government has certain rights in the invention.

TECHNICAL FIELD

This invention was made with United States government support under a contract awarded by a Federal agency. The government has certain rights in the invention. The present invention relates generally to a method, system, and computer program product for network device discovery. More particularly, the present invention relates to a method, system, and computer program product for device discovery and classification from encrypted network traffic.

BACKGROUND

Network management is the process of administering and managing a computer network. Network management software is often used to provision, discover, monitor, and maintain a computer network. A provisioning function of network management software typically allows a network manager to provision new network devices in an environment. A mapping or discovery function of network management software enables the software to discover features in the computer network by collecting information associated with network devices connected to the computer network such as connectivity between devices, vendor types of devices, capabilities of devices, and performance characteristics of devices. A monitoring function of network management software allows the software to monitor the computer network for performance problems. A maintenance function of the network management software allows a network manager to maintain the network devices such as updating the network devices or re-configuring the network devices.

SUMMARY

The illustrative embodiments provide a method, system, and computer program product. An embodiment of a computer-implemented method includes extracting handshake protocol layer features from training data associated with encrypted network traffic of a plurality of classified devices, and extracting record protocol layer features from the training data. The embodiment further includes training one or more models based on the extracted handshake protocol layer features and the extracted record protocol layer features. The embodiment further includes applying the one or more models to an observed encrypted network traffic stream associated with a device to determine a predicted device classification of the device.

In another embodiment, each of the one or more models are applied individually to determine the predicted device classification. In another embodiment, the one or more models are combined in at least one of a serial manner or a parallel manner to determine the predicted device classification. Another embodiment further includes determining a confidence level of the predicted device classification.

In another embodiment, training of the one or more models further includes training a first model of the one or more modules using the extracted handshake protocol layer features. In another embodiment, training the first model further includes determining a term-frequency/inverse-document-frequency (TF-IDF) measure for devices from associated extracted handshake protocol layer features, and determining a similarity matrix based on the TF-IDF measure for the devices from the associated extracted handshake protocol layer features.

In another embodiment, training of the one or more models further includes training a second model of the one or more modules using the extracted record protocol layer features. In another embodiment, training the second model further includes determining a gradient-boosting model based upon the extracted record protocol layer features.

In another embodiment, the first model is configured to determine a number of device scores greater than a predetermined threshold value based upon applying the first model to the observed encrypted network traffic stream.

In another embodiment, the second model is configured to determine a set of binary classification based upon the device scores, and determine the predicted device classification of the device based upon the set of binary classifications.

In another embodiment, the second model is configured to determine a binary classification based upon applying the second model to the observed encrypted network traffic stream.

Another embodiment further includes determining the predicted device classification of the device based upon the device scores and the set of binary classifications.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 9 depicts a flowchart of an example process for parallel analysis of handshake protocol layer features and record protocol layer features of an encrypted network traffic stream in accordance with an illustrative embodiment.

DETAILED DESCRIPTION

Figure 1:
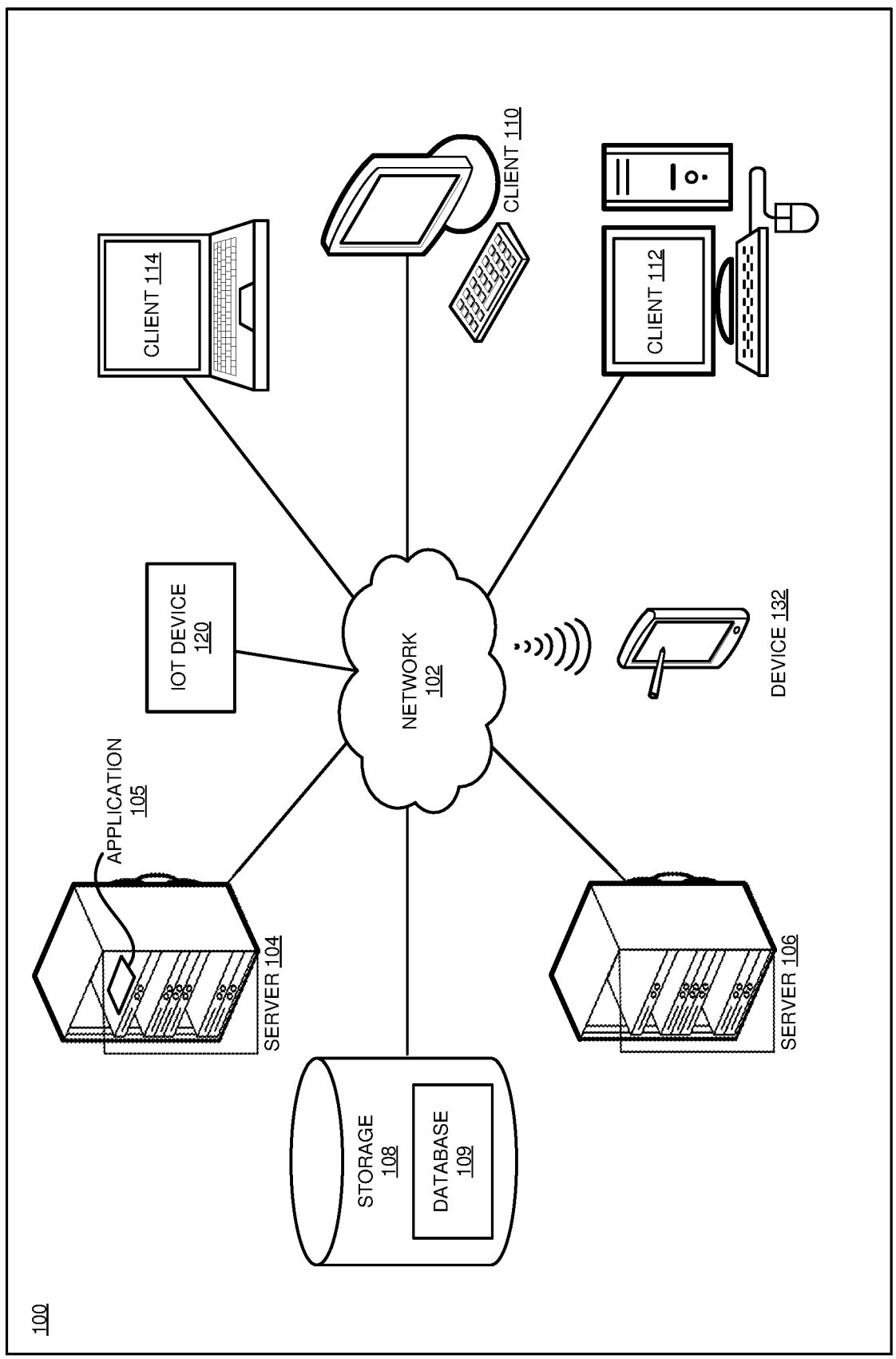
FIG. 1 depicts a block diagram of a network of data processing systems in which illustrative embodiments may be implemented.

The illustrative embodiments described herein are directed to device discovery and classification from encrypted network traffic. Embodiments recognize that the proliferation of network devices such as embedded devices and Internet-of-Things (IoT) devices has made the tracking and management of these devices challenging to network administrators are others. Exacerbating the situation is the ease with which these devices can be added to a network environment, requiring little or no involvement of Information Technology (IT) support or registration. Embodiments recognize that, in such an environment, it is difficult to ensure that all devices are being monitored and that the devices are running the latest software updates/patches. In addition, it is difficult to address implementation flaws or potential security vulnerabilities.

Embodiments recognize that traditional methods for managing computer systems are difficulty to apply to the embedded space. Most embedded devices are closed systems and have limited support for installing additional software or running agents. As an example, embedded devices can often only be updated by the manufacture of the device or vendors of the device, or by possessing authorization keys (e.g., a public key pair or a symmetric key) to enable updates on the devices.

Embodiments recognize that these challenges are magnified by the increasingly larger share of encrypted traffic generated by embedded devices and IoT devices. For example, many of embedded devices use the transport layer security (TLS) or the earlier developed secure sockets layer (SSL) protocol to communicate with remote servers. These protocols ensure that data transmitted between the embedded device and the remote server is encrypted making discovery and classification of such devices difficult.

One or more embodiments described herein address the problem of passive device discovery and classification/identification of devices utilizing encrypted network traffic by analyzing the encrypted network traffic and leveraging the analysis to classify/identify the network devices based on the analysis of the encrypted network traffic. Accordingly, various embodiments allow the ability to obtain visibility of the network devices that have encrypted their network traffic.

An example scenario in which obtaining this visibility may be crucial is a lift and shift situation in which an existing IT provider is replaced with another IT provider for managing a computer infrastructure. For example, in such a scenario it may be necessary for a devices' back-end data storage and analytics to be migrated from a premise to a cloud infrastructure. Thus, it is crucial to know what devices are deployed in the environment for effective management and/or migration to another IT infrastructure. By observing and analyzing network traffic at known key points (e.g., at gateway or routers), one or more embodiments accurately assess the devices that are deployed in the network environment.

Another example scenario is a security audit of a network environment. One or more embodiments may identify devices using features extracted from the devices' secure communication channels (e.g., encrypted traffic) to facilitate the detection of devices that are vulnerable due to reported Common Vulnerabilities and Exposures (CVEs) or missing patches. IoT devices, for example, have been known to have security vulnerabilities. One or more embodiments take actions after detecting a vulnerable device to mitigate the security risk. The actions can be passive and/or active, involving alerting system managers or administrators of vulnerable devices, segmenting the network to separate vulnerable devices from other network devices, or quarantining vulnerable devices by restricting network connections to other network devices.

One or more embodiments analyze a handshake protocol layer (e.g., a TLS handshake protocol layer) and a record layer protocol layer (e.g., a TLS record protocol layer) of encrypted network traffic to discover and classify devices using a training phase and a prediction phase. In one or more embodiments, the handshake protocol layer features are transmitted in an unencrypted form and thus observable by an application. A handshake protocol layer manages the authentication and key exchange required to establish a secure session between devices. A handshake protocol often includes one or more of a proposed cipher suite in the protocol negotiation which determines which cipher suite (e.g., TLS_RSA_WITH_AES_256_CBC_SHA, TLS_ECDHE_RSA_WITH_AES_256_GCM_SHA384, etc.) will be used for the session, and an authentication using public and private keys. A record protocol layer is used to secure application data using the keys created during the handshake by encrypting outgoing data and decrypting incoming data using the keys, and verifying the integrity of the data.

In a particular embodiment, an application identifies TLS protocol features (e.g., fields) for identifying and classifying devices. In the embodiment, the application derives TLS fingerprints from the TLS handshake protocol layer based on one or more of the following relevant protocol fields: negotiated cipher, proposed cipher suites, server name extension, and destination end-point. In the embodiment, the application employs a statistical-based approach for classifying devices such as a term frequency-inverse document frequency (TF-IDF) approach.

TF-IDF is a numeric statistic that is intended to reflect how important a word is to a document in a collection or corpus and is the product of two statistics, term frequency and inverse document frequency. Term frequency is a measure of the number of times a term occurs in a document. Inverse document frequency is a measure of the uniqueness of the word in the collection, e.g., if it is common or rare across all documents in a corpus. The inverse document frequency is the logarithmically scaled inverse fraction of documents that contain the word obtained by dividing the total number of documents in the corpus by the number of documents containing the term, and then taking the logarithm of the quotient. The TF-IDF is calculated as the product of the term frequency and inverse document frequency. In the embodiment, devices are mapped to documents and TLS handshake protocol features are mapped to words which are associated with devices.

In the embodiment, the application extracts features for the TLS record protocol layer including the number of encrypted packets and bytes transferred between the client device and a server. In an embodiment, the application applies a gradient-boosting (GB) algorithm to the TLS record extracted features, creating binary classifiers for predicting device classification. Gradient boosting is a machine learning technique for regression and classification problems which produces a prediction model in the form of an ensemble of weak prediction models, typically decision trees, in which a loss function is defined and minimized. In the embodiment, the extracted features for the TLS record protocol layer are applied to a GB algorithm to create GB-based classifiers for predicting device classification. In other embodiments, other techniques instead of GB techniques or in addition to GB techniques may be applied to the TLS record extracted features for predicting device classification.

One or more embodiments provide for a computer-implemented method for classifying or detecting a device type from encrypted network traffic associated with the device. In an embodiment, relevant features are extracted from records of encrypted network traffic of previously classified devices. In particular embodiments, the relevant features include one or more of a destination server, a negotiated cipher, proposed cipher suites, a server name extension, and numbers of encrypted packets and/or bytes sent (i.e., transmitted) in one or more directions.

In the embodiment, trained models are generated from the extracted features associated with the devices, and the trained models are applied to an observed encrypted network traffic stream. In the embodiment, the models generate predictive device types with confidence levels or scores associated with the encrypted traffic.

In one or more embodiments, an application is configured to extract the handshake protocol layer features and record protocol layer features from training data and/or an observed encrypted traffic stream using cognitive processing or other suitable machine-learning processes.

It should be understood that although one or more embodiments are described as utilizing TF-IDF and GB algorithms, other suitable algorithms may be used for identifying and classifying devices. For example, in other particular embodiments, one or more of support vector machine (SVM), random decision forest (RDF), and K-nearest neighbors (KNN) may be used for generating classifiers from extracted features. In a particular embodiment, TLS features can be filtered to improve device classification results, and/or reduce space complexity and computational complexity. An example is selecting n top-level domains (e.g., domain and suffix name when n equals 2) from the server name extension (i.e., fully qualified domain name (FQDN)). Another example is to apply a netmask (e.g., 32-bit, 24-bit, or 16-bit) to the destination server IP to refine the feature.

In an embodiment, the application combines the analysis of the handshake protocol and the record protocol of the encrypted network traffic in a serial manner in which the output of the handshake protocol analysis is fed to the record protocol binary classifiers to produce a device classification. In another embodiment, the application combines the analysis of the handshake protocol and the record protocol of the encrypted network traffic in a parallel manner in which the output of the handshake protocol analysis and the output of the record protocol binary classifiers are fused or combined together to produce a device classification. One or more embodiments described herein are deployed to passively observe encrypted network traffic either inside or outside of a firewall and/or gateway for identifying devices within a network.

Although various embodiments are described with respect to analysis of handshake protocol features and record protocol features, it should be understood that in other embodiments the principles described are suitable for analysis of any two-step communication security protocol that first negotiates encryption parameters in the clear and then encrypts the data exchange using the negotiated parameters.

An embodiment can be implemented as a software application. The application implementing an embodiment can be configured as a modification of an existing network management system or platform, as a separate application that operates in conjunction with an existing network management system or platform, a standalone application, or some combination thereof.

The illustrative embodiments are described with respect to certain types of tools and platforms, procedures and algorithms, services, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
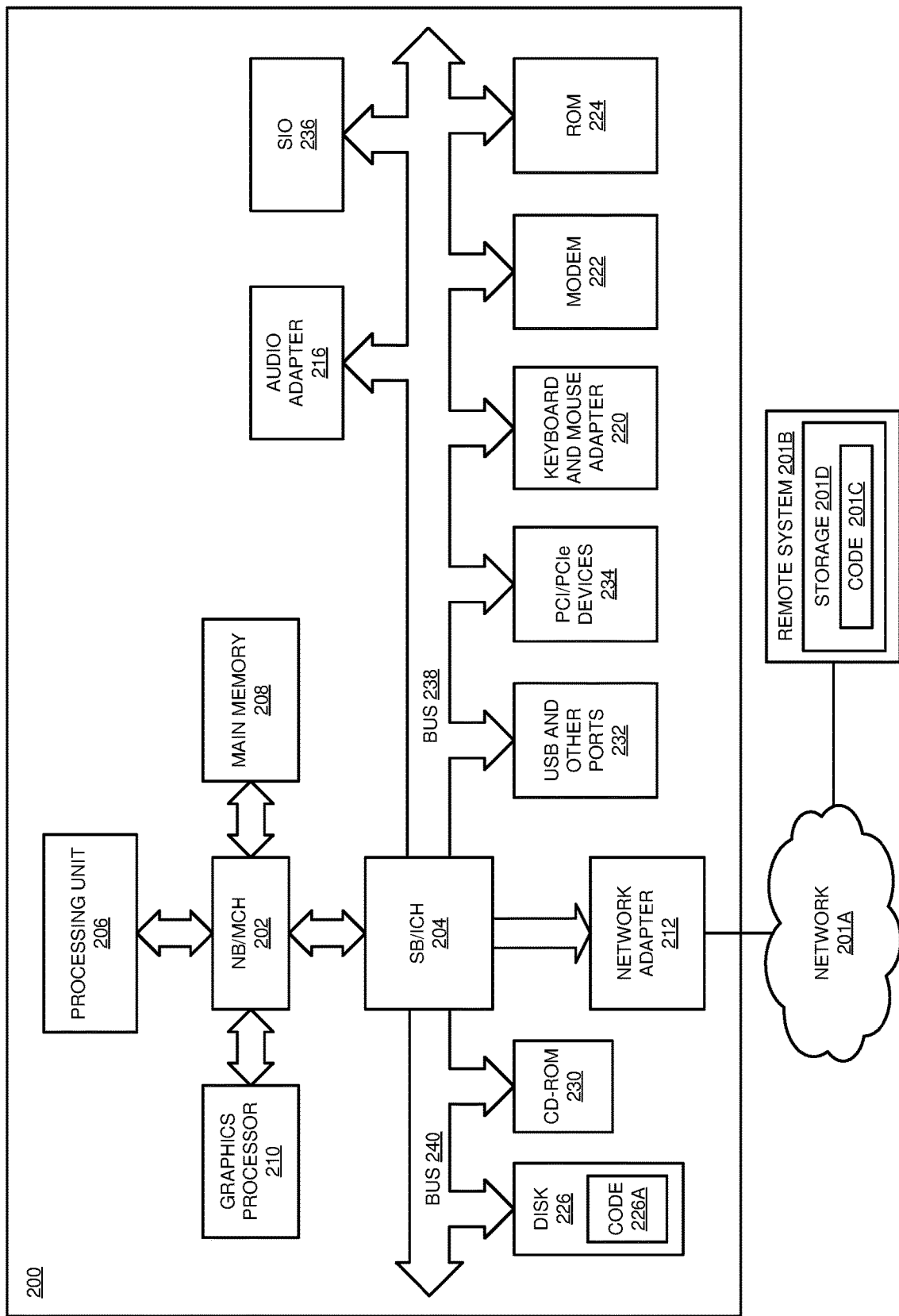
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown. Server 104 includes an application 105 that may be configured to implement one or more of the functions described herein for device discovery and classification from encrypted network traffic in accordance with one or more embodiments.

Storage device 108 includes one or more databases 109 configured to store data such as network traffic data used for training of handshake protocol models and record protocol models as described herein. Data processing environment 100 further includes one or more IoT devices 120 configured to provide IoT data such as described with respect to certain embodiments herein. In particular embodiments, IoT devices 120 may include one or more of an embedded device, a smart speaker, a home automation device, a sensor device, a telephone device, or other communication device associated with network 102.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as device 132 or server 104 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
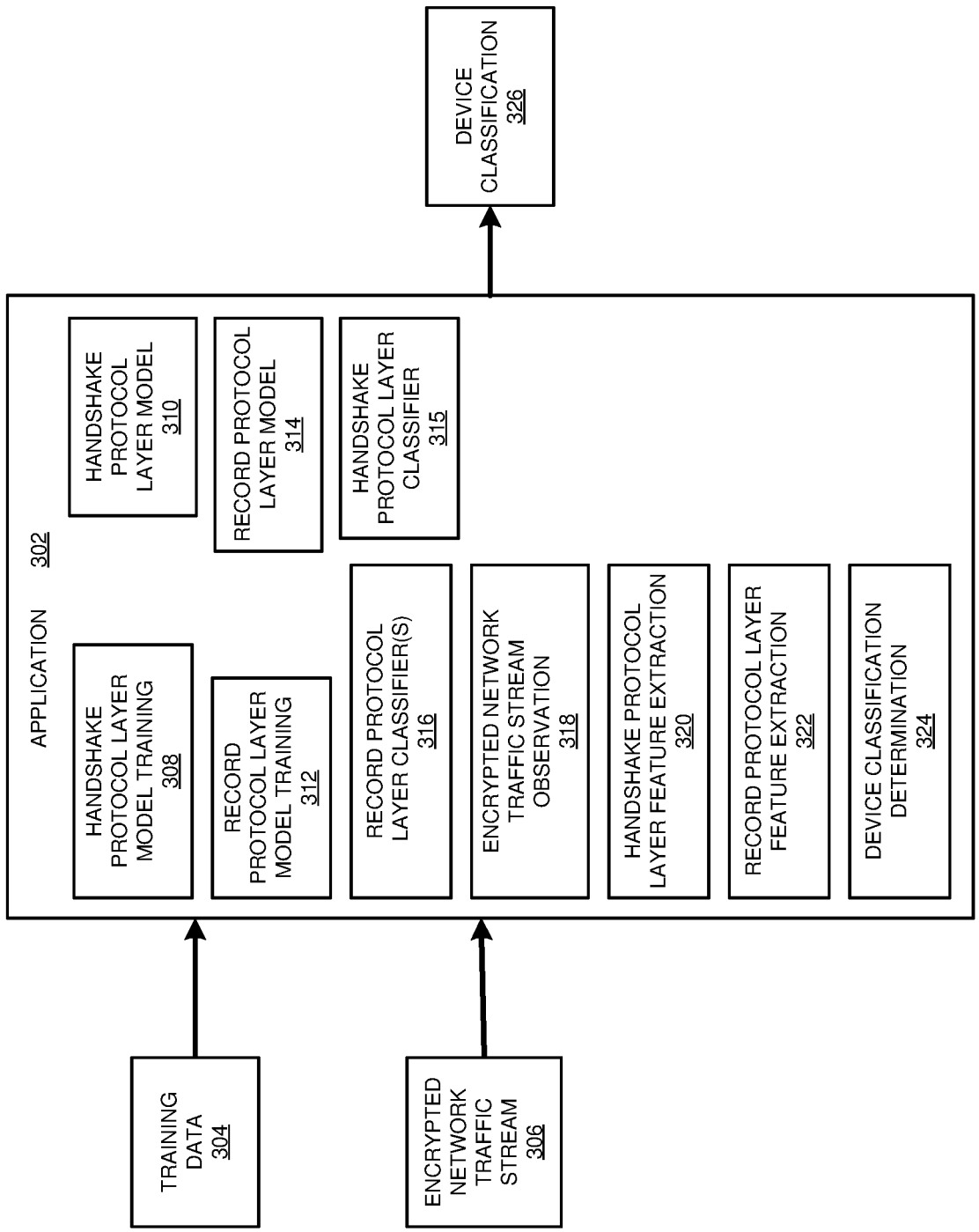
FIG. 3 depicts a block diagram of an example configuration device discovery and classification from encrypted network traffic in accordance with an illustrative embodiment.

With reference to FIG. 3, this figure depicts a block diagram of an example configuration 300 device discovery and classification from encrypted network traffic in accordance with an illustrative embodiment. The example embodiment includes an application 302. In a particular embodiment, application 302 is an example of application 105 of FIG. 1.

Application 302 receives training data 304 from a collection of devices containing one or more handshake protocol layer features and record protocol layer features relevant to classifying a device. In particular embodiments, the training data 304 includes saved packet capture (pcap) files and/or human readable log files of observed TLS flows of known devices. Application 302 further receives an encrypted network traffic stream 306 for analysis to determine a device classification of one or more devices associated with encrypted network traffic stream 306.

Application 302 includes a handshake protocol layer model training component 308, a handshake protocol layer model 310, a record protocol layer model training component 312, a record protocol layer model 314, a handshake protocol layer classifier 315, one or more record protocol layer classifiers 316, an encrypted network traffic stream observation component 318, a handshake protocol layer feature extraction component 320, a record protocol layer feature extraction component 322, and a device classification determination component 324.

Handshake protocol layer model training component 308 is configured to receive training data 304, extract handshake protocol layer features from training data 304, train handshake protocol layer model 310 based upon the extracted handshake protocol layer features, and create handshake protocol layer classifier 315 as further described herein. Record protocol layer model training component 312 is configured to receive training data 304, extract record protocol layer features from training data 304, train record protocol layer model 314 based upon the extracted record protocol layer features, and create the one or more record protocol layer classifiers 316 as further described herein.

Encrypted network traffic stream observation component 318 is configured to passively observe encrypted network traffic stream 306. Handshake protocol layer feature extraction component 320 is configured to extract one or more handshake protocol layer features from encrypted network traffic stream 306. Record protocol layer feature extraction component 322 is configured to extract one or more record protocol layer features from encrypted network traffic stream 306. Device classification determination component 324 is configured to apply the extracted handshake protocol layer features to handshake protocol layer classifier 315 and apply the extracted record protocol layer features to the one or more record protocol layer classifiers 316. Device classification determination component 324 is further configured to determine a device classification 326 and associated confidence level for one or more network devices based upon outputs of handshake protocol layer classifier 315 and the one or more record protocol layer classifiers 316 as further described herein.

Figure 4:
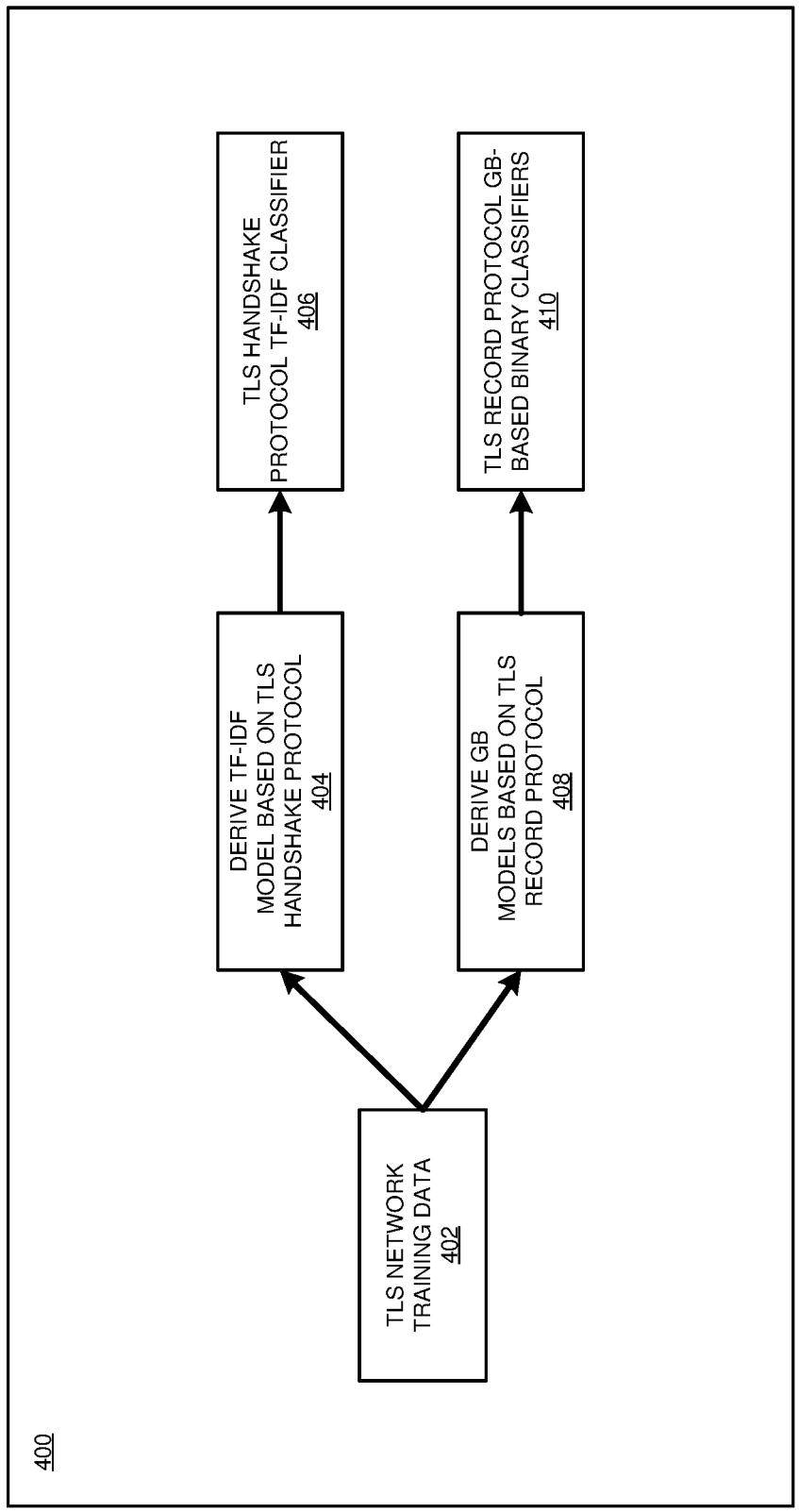
FIG. 4 depicts an example sequence for training a handshake protocol layer model and record protocol layer model in accordance with an illustrative embodiment.

With reference to FIG. 4, this figure depicts an example sequence 400 for training a handshake protocol layer model and record protocol layer model in accordance with an illustrative embodiment. In the embodiment, application 105 receives TLS network training data 402 and extracts TLS handshake protocol layer features and TLS record protocol layer features associated with one or more devices in association with one or more devices. In the embodiment, application 105 derives a TF-IDF model 404 based upon the TLS handshake protocol layer features extracted from TLS network training data 402 to create a TLS handshake protocol TF-IDF classifier 406. In the embodiment, application 105 derives a GB model 408 based on the TLS record protocol layer features extracted from TLS network training data 402 to derive TLS record protocol GB-based binary classifiers 410. In one or more embodiments, application 105 utilizes TLS handshake protocol TF-IDF classifier 406 and TLS record protocol GB-based binary classifiers 410 to analyze observed TLS encrypted traffic in a network to determine a device classification and associated confidence level of one or more devices in the network.

Figure 5:
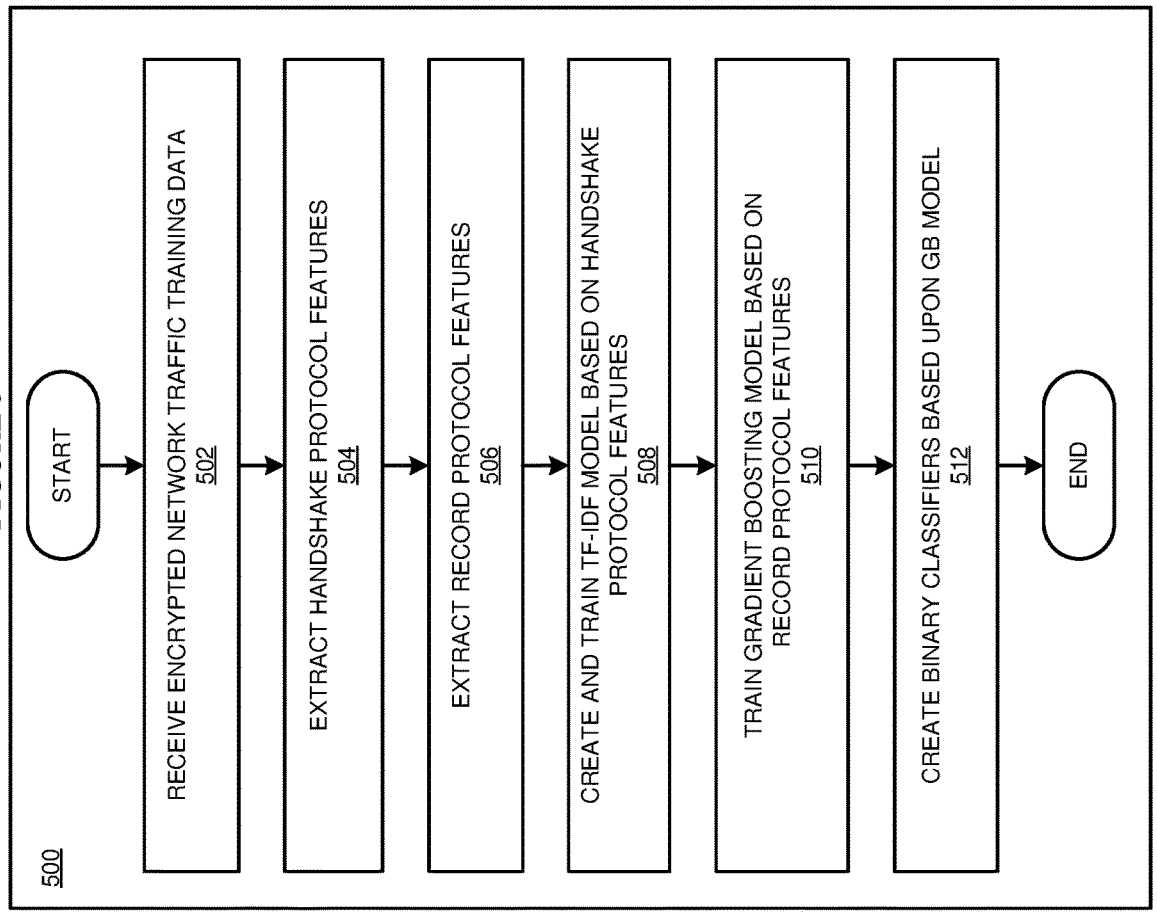
FIG. 5 depicts a flowchart of an example process for training a handshake protocol layer model and record protocol layer model in accordance with an illustrative embodiment.

With reference to FIG. 5, this figure depicts a flowchart of an example process 500 for training a handshake protocol layer model and record protocol layer model in accordance with an illustrative embodiment.

In block 502, application 105 receives encrypted network traffic training data from a corpus of training data. In block 504, application 105 extracts handshake protocol layer features from the training data. In a particular embodiment, the handshake protocol layer features include one or more of proposed cipher suites, a negotiated cipher, a port number, a server name extension (e.g., a domain or suffix name), and a destination server (e.g., a prefix of an IP address of the server). In block 506, application extracts record protocol layer features from the training data. In a particular embodiment, the record protocol layer features include one or more of a number of encrypted packets and bytes transferred between a device and a server.

In one or more embodiments, the training data include a plurality of documents in which each document is associated with a device type, and each document includes data representative of the handshake protocol layer features. In a particular embodiment, each handshake protocol layer feature is represented by one or more words or phrases in the document.

In block 508, application 105 creates and trains a TF-IDF model based upon the extracted handshake layer protocol features. In an embodiment, application 105 uses a TF-IDF weighting scheme which considers the frequencies of words in a document and the rarity of words in the set of document under consideration. The TF-IDF weighting scheme is given by the following equation: TF * log2 (number of documents in corpus/ number of documents containing the word). In an embodiment using TLS handshake protocol layer data, application 105 maps devices to documents and TLS handshake protocol layer features to words. In a particular embodiment, the TLS handshake protocol layer features include proposed cipher suites, a negotiated cipher, a server name extension and a destination server.

In the embodiment, application 105 derives a similarity matrix from the training data set. In the embodiment, the similarity matrix is a normalized matrix that associates devices to TF-IDF weights of their respective handshake protocol layer features. In a particular embodiment, application 105 generates the similarity matrix by: (1) creating a set of documents from the training data that maps devices to their respective features represented as words in the document; (2) retrieving words from the documents to derive a dictionary (or vocabulary) from the set of documents such that the dictionary is a set of words representing features of the devices; (3) generating the similarity matrix by computing the TF-IDF weight for each word in the document for every document in the corpus in which each row in the similarity matrix represents a device, and each column is a feature associated with the device such that a row is considered a vector in the space of the number of columns; (4) normalizing the similarity matrix, i.e., for each vector divide each of its component by its length (magnitude); and (5) associate a device type classification label with each row (vector).

In block 510, application 105 trains a gradient boosting (GB) model based on the record protocol layer features from the training data. In block 512, application 105 creates one or more binary classifiers based upon the GB model. A GB model is a sequence of weak prediction models. The GB training process trains the first weak model, looks at the prediction errors from the first model, and then train a second model which aims to correct the errors of the first model. The GB training process then trains a third model to correct the errors of the second model. This training process continues until the errors are smaller than a predetermined threshold or the model converges. Although various embodiments are described with respect to using a GB model, it should be understood that in other embodiments any binary or multiclass classifier could be used. Process 500 then ends.

Figure 6:
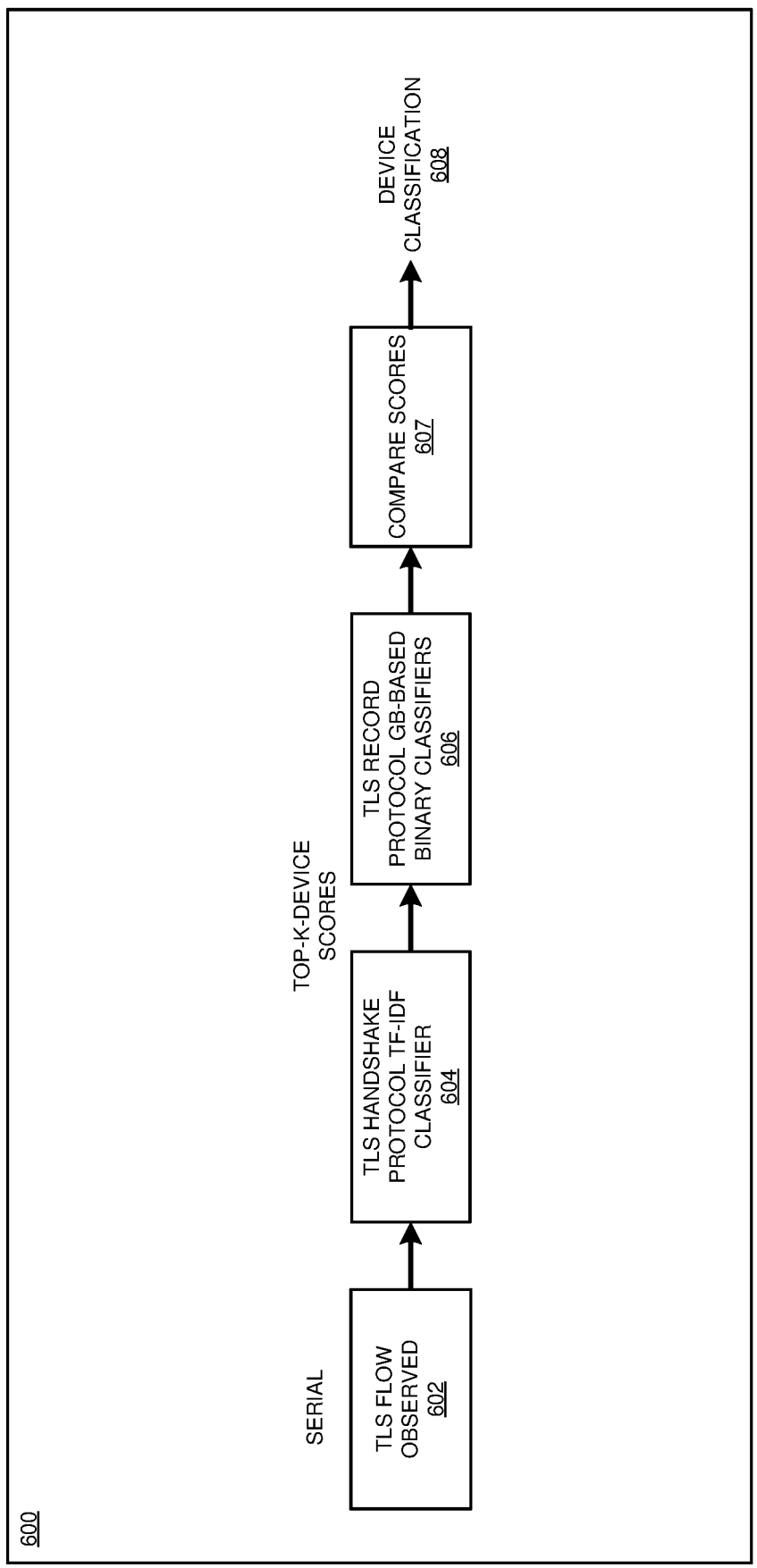
FIG. 6 depicts an example sequence for serial analysis of handshake protocol layer features and record protocol layer features of an encrypted network traffic stream in accordance with an illustrative embodiment.

With reference to FIG. 6, this figure depicts an example sequence 600 for serial analysis of handshake protocol layer features and record protocol layer features of an encrypted network traffic stream to predict a device classification in accordance with an illustrative embodiment. In the embodiment, application 105 observes a TLS traffic flow 602, extracts TLS handshake protocol layer features and applies a TLS handshake protocol TF-IDF classifier 604 to the extracted handshake protocol layer features to determine the top-k device scores in which k represents the number of devices that have the highest scores in the similarity matrix greater than a threshold value.

In a particular embodiment, application 105 observes TLS flows and predicts a device classification with associated scores using a similarity matrix. For each TLS flow, application 105 extracts TLS handshake protocol layer features and converts each of the features into its TF-IDF representation, creating a query vector. In the embodiment, application 105 scores the documents based on the proximity of the document to the vector query. In a particular embodiment, a similarity score is calculated as the cosine of an angle between the query and a document row in the similarity matrix. In one or more embodiments, the higher the score, the closer the query is to the document (row). For every document in the corpus, application 105 generates a score for the vector query in a range of zero to one [0,1]. Application 105 returns the top-k documents (i.e., device classification) with associated scores. In a particular embodiment, application 105 returns the top-k documents with scores greater than some threshold (e.g., 0.8).

In the embodiment, application 105 extracts the TLS record protocol layer features associated with devices having the top-k device scores to TLS record protocol GB-based binary classifiers 606 and GB-based binary classifiers 606 analyze the extracted TLS record protocol layer features. In a particular embodiment, the confidence score is the device score associated with the determined device. In the embodiment, each of GB-based binary classifiers 606 output a confidence score for an observed TLS flow. Application 105 compares the confidence scores to one another and to the scores associated with the TLS handshake protocol layer features to determine a final device classification 608 for the device and an associated confidence score.

Figure 7:
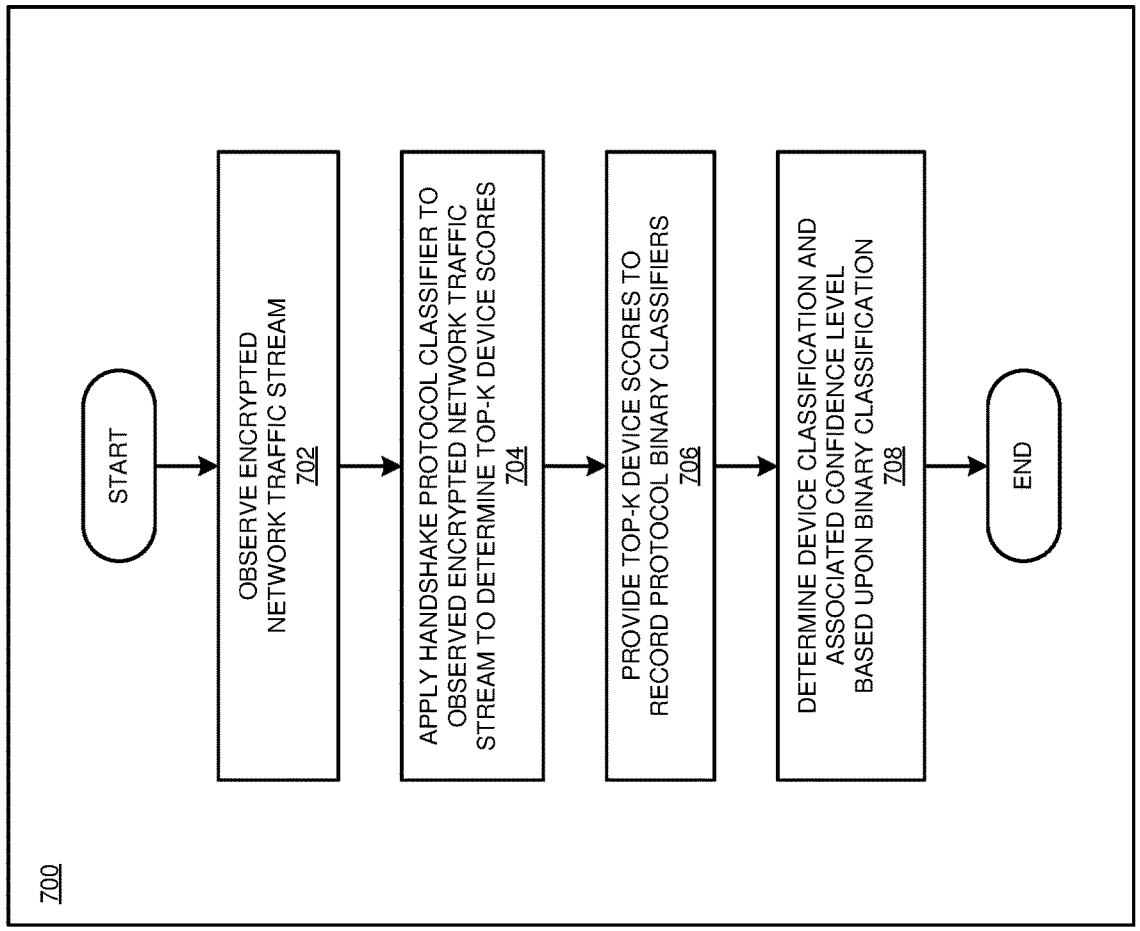
FIG. 7 depicts a flowchart of an example process for serial analysis of handshake protocol layer features and record protocol layer features of an encrypted network traffic stream.

With reference to FIG. 7, this figure depicts a flowchart of an example process 700 for serial analysis of handshake protocol layer features and record protocol layer features of an encrypted network traffic stream to predict a device classification in accordance with an illustrative embodiment. In block 702, application 105 observes an encrypted network traffic stream. In block 704, application 105 extracts handshake protocol layer features from the observed encrypted network traffic stream and applies a handshake protocol classifier to the extracted handshake protocol layer features to determine the top-k device scores greater than a predetermined threshold value.

In block 706, application 105 provides the top-k device scores to a record protocol layer binary classifier In block 708, application 105 extracts the record protocol layer features associated with devices having the top-k device scores and provides the extracted record protocol layer features to the record protocol layer binary classifier. The record protocol layer classifier analyzes the extracted record protocol layer features to determine a device classification for the device and an associated confidence level. In a particular embodiment, the confidence level is representative of the device score associated with the determined device. Process 700 then ends.

Figure 8:
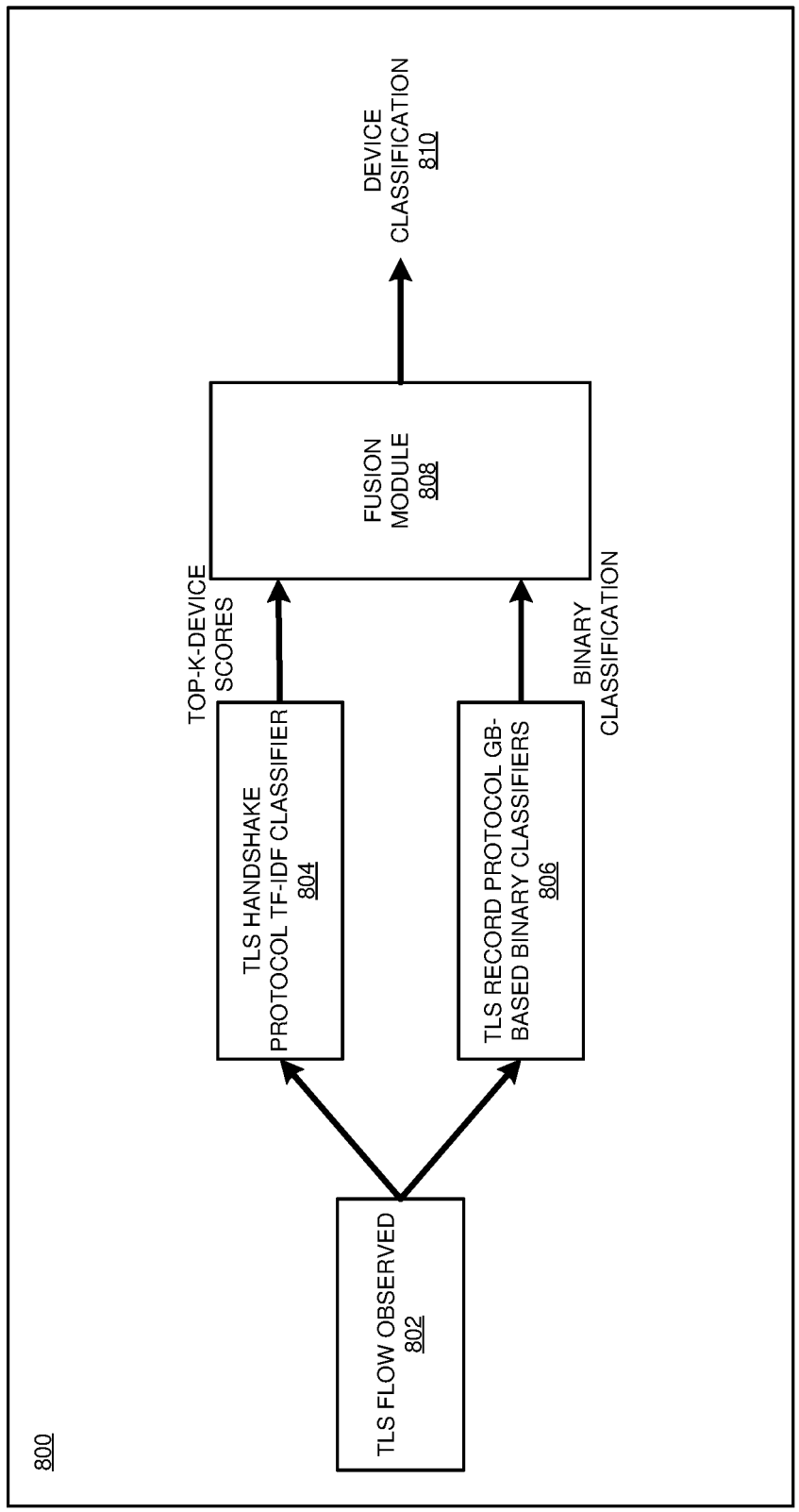
FIG. 8 depicts an example sequence for parallel analysis of handshake protocol layer features and record protocol layer features of an encrypted network traffic stream in accordance with an illustrative embodiment.

With reference to FIG. 8, this figure depicts an example sequence 800 for parallel analysis of handshake protocol layer features and record protocol layer features of an encrypted network traffic stream to predict a device classification in accordance with an illustrative embodiment. In the embodiment, application 105 observes a TLS traffic flow 802, extracts TLS handshake protocol layer features from TLS traffic flow 802, and applies a TLS handshake protocol TF-IDF classifier 804 to the extracted handshake protocol layer features to determine the top-k device scores in which k represents the number of documents associated with devices having highest scores in the similarity matrix greater than a predetermined threshold value. Application 105 provides the top-k device scores to a fusion module 808. In a particular embodiment, application 105 returns the top-k devices with device scores greater than a threshold value.

In the embodiment, application 105 extracts TLS record protocol layer features from the observed TLS traffic flow 802 and applies the extracted TLS record protocol layer features to TLS record protocol GB-based binary classifiers 806. In the embodiment, TLS record protocol layer GB-based binary classifiers 806 analyze the extracted TLS record protocol layer features to determine binary classifications and provides the binary classification to fusion module 808. In the embodiment, fusion module 808 determines a device classification 810 and associated confidence score based upon the top-k device scores and binary classifications. In a particular embodiment, the confidence score is a gap in between the first most likely device and the second most likely device. In a particular embodiment, fusion module 808 determines the device classification based upon a majority vote which is computed by adding the highest top-k device scores with binary classification scores.

With reference to FIG. 9, this figure depicts a flowchart of an example process 900 for parallel analysis of handshake protocol layer features and record protocol layer features of an encrypted network traffic stream to predict a device classification in accordance with an illustrative embodiment. In block 902, application 105 observes an encrypted network traffic stream. In block 904, application 105 extracts handshake protocol layer features from the observed encrypted network traffic stream and applies a handshake protocol classifier to the extracted handshake protocol layer features to determine a top-k device scores greater than a predetermined threshold value.

In block 906, application 105 extracts record protocol layer features from the observed encrypted network traffic stream and applies the extracted record protocol layer features to one or more binary classifiers to analyze the extracted record protocol layer features to determine binary classifications. In block 908, application 105 determines a device classification and associated confidence level based upon the top-k device scores and the binary classifications. In a particular embodiment, the confidence level is representative of the device score associated with the determined device. Process 900 then ends.

Thus, a computer implemented method, system or apparatus, and computer program product are provided in the illustrative embodiments for device discovery and classification from encrypted network traffic and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, the method comprising:
   extracting handshake protocol layer features from training data associated with encrypted network traffic of a plurality of classified devices;
   extracting record protocol layer features from the training data;
   training a first model based on the extracted handshake protocol layer features, wherein the training comprises:
      generating a document that contains text describing handshake protocol features of a device type; and
      generating a similarity matrix having a row associated with the device type and a column associated with a handshake protocol feature, wherein the column of the row contains a normalized weight of words from the text of the document associated with the handshake protocol feature of the device type;
   training a second model based on the extracted record protocol layer features, wherein the second model is different from the first model;
   applying the first model with the extracted handshake protocol layer features to an observed encrypted network traffic stream resulting in similarity scores output by the first model for the plurality of classified devices;
   extracting record protocol layer features used for classification by the second model, wherein the record protocol layer features are extracted from the observed encrypted network traffic for a subset of the plurality of classified devices having similarity scores output by the first model above a threshold level associated with the first model; and
   applying the second model to the observed encrypted network traffic stream using the extracted record protocol layer features from the subset of the plurality of classified devices to determine a predicted device classification of the device from among the subset of the plurality of classified devices.

2. The computer-implemented method of claim 1, wherein each of the first and second models are applied individually to determine the predicted device classification.

3. The computer-implemented method of claim 1, wherein the first and second models are combined in at least one of a serial manner or a parallel manner to determine the predicted device classification.

4. The computer-implemented method of claim 1, further comprising:
   determining a confidence level of the predicted device classification.

5. The computer-implemented method of claim 1, wherein training the first model further includes:
   determining a term-frequency/inverse-document-frequency (TF-IDF) measure for the device from associated extracted handshake protocol layer features,
   wherein the generating of the similarity matrix comprises generating the weight of the words based on the TF-IDF measure for the device from the associated extracted handshake protocol layer features.

6. The computer-implemented method of claim 5, wherein training the second model further includes:
   determining a gradient-boosting model based upon the extracted record protocol layer features.

7. The computer-implemented method of claim 1, wherein the first model is configured to determine a number of device scores greater than a predetermined threshold value based upon applying the first model to the observed encrypted network traffic stream.

8. The computer-implemented method of claim 7, wherein the second model is configured to:
   determine a set of binary classifications based upon the device scores; and
   determine the predicted device classification of the device based upon the set of binary classifications.

9. The computer-implemented method of claim 7, wherein the second model is configured to:
   determine a set of binary classifications based upon applying the second model to the observed encrypted network traffic stream.

10. The computer-implemented method of claim 9, further comprising:
    determining the predicted device classification of the device based upon the device scores and the set of binary classifications.

11. A computer usable program product comprising one or more computer-readable storage devices, and program instructions stored on at least one of the one or more storage devices, the stored program instructions comprising:
    program instructions to extract handshake protocol layer features from training data associated with encrypted network traffic of a plurality of classified devices;
    program instructions to extract record protocol layer features from the training data;
    program instructions to train a first model based on the extracted handshake protocol layer features, wherein the program instructions to train the first model comprise:
    program instructions to generate a document that contains text describing handshake protocol features of a device type; and
    program instructions to generate a similarity matrix having a row associated with the device type and a column associated with a handshake protocol feature, wherein the column of the row contains a normalized weight of words from the text of the document associated with the handshake protocol feature of the device type;
    program instructions to train a second model based on the extracted record protocol layer features, wherein the second model is different from the first model;
    program instructions to apply the first model with the extracted handshake protocol layer features to an observed encrypted network traffic stream resulting in similarity scores output by the first model for the plurality of classified devices;
    program instructions to extract record protocol layer features used for classification by the second model, wherein the record protocol layer features are extracted from the observed encrypted network traffic for a subset of the plurality of classified devices having similarity scores output by the first model above a threshold level associated with the first model; and program instructions to apply the second model to the observed encrypted network traffic stream using the extracted record protocol layer features from the subset of the plurality of classified devices to determine a predicted device classification of the device from among the subset of the plurality of classified devices.

12. The computer usable program product of claim 11, wherein each of the first and second models are applied individually to determine the predicted device classification.

13. The computer usable program product of claim 11, wherein the first and second models are combined in at least one of a serial manner or a parallel manner to determine the predicted device classification.

14. The computer usable program product of claim 11, further comprising:
program instructions to determine a confidence level of the predicted device classification.

15. The computer usable program product of claim 11, wherein the computer usable code is stored in a computer readable storage device in a data processing system, and wherein the computer usable code is transferred over a network from a remote data processing system.

16. The computer usable program product of claim 11, wherein the computer usable code is stored in a computer readable storage device in a server data processing system, and wherein the computer usable code is downloaded over a network to a remote data processing system for use in a computer readable storage device associated with the remote data processing system.

17. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to extract handshake protocol layer features from training data associated with encrypted network traffic of a plurality of classified devices;

program instructions to extract record protocol layer features from the training data;

program instructions to train a first model based on the extracted handshake protocol layer features, wherein the program instructions to train the first model comprise:

program instructions to generate a document that contains text describing handshake protocol features of a device type; and program instructions to generate a similarity matrix having a row associated with the device type and a column associated with a handshake protocol feature, wherein the column of the row contains a normalized weight of words from the text of the document associated with the handshake protocol feature of the device type;

program instructions to train a second model based on the extracted record protocol layer features, wherein the second model is different from the first model;

program instructions to apply the first model with the extracted handshake protocol layer features to an observed encrypted network traffic stream resulting in similarity scores output by the first model for the plurality of classified devices;

program instructions to extract record protocol layer features used for classification by the second model, wherein the record protocol layer features are extracted from the observed encrypted network traffic for a subset of the plurality of classified devices having similarity scores output by the first model above a threshold level associated with the first model; and program instructions to apply the second model to the observed encrypted network traffic stream using the extracted record protocol layer features from the subset of the plurality of classified devices to determine a predicted device classification of the device from among the subset of the plurality of classified devices.

\* \* \* \* \*